Patented Oct. 15, 1929

1,731,637

UNITED STATES PATENT OFFICE

HEINRICH POLIKIER, OF LEIPZIG, AND OTTO BOEGER, OF DESSAU IN ANHALT, GERMANY, ASSIGNORS TO GENERAL ANILINE WORKS, INC., OF NEW YORK, N. Y., A CORPORATION OF DELAWARE

TRIARYLMETHANE DYE

No Drawing. Application filed July 8, 1927, Serial No. 204,408, and in Germany August 9, 1926.

The dyes of the triarylmethane series, which are characterized by their dyeing power and the clearness of their dyeings, have the great disadvantage that they are comparatively fugitive in light. Somewhat better in respect of fastness to light are those triarylmethane dyes in which there is an aryl consisting of the residue of diphenylamine.

The present invention is based on the observation that when in the 4'-position of this diphenylamine residue there is an alkoxygroup as substituent the triarylmethane dyes have a fastness to light hitherto unknown for this group.

The new dyes are alkali metal salts of sulfonic acids derived from compounds of the general formula:

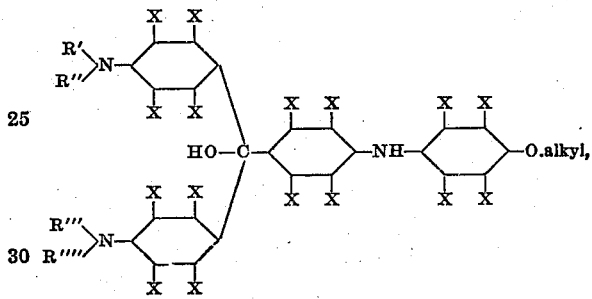

in which formula R', R'', R''', R'''' and X stand for univalent radicles.

The dyes may be manufactured by the usual processes suitable for producing triarylmethane dyes. The nature of the two other aryl groups in the dye determine the remaining properties in respect of dyeing and those properties are in general advantageous. From a feebly acid bath wool is dyed blue tints.

The following examples illustrate the invention without limiting it, the parts being by weight:

*Example 1.*—20 parts of 4-methoxydiphenylamine are condensed in the presence of 11 parts of phosphorus oxychloride and some toluene with 30 parts of 4.4'-tetramethyl-diaminobenzophenone. The basic dye formed is separated from the aqueous solution of the melt and dried and sulfonated in the usual manner. The mass is poured into water and the dye-acid which separates is reprecipitated from sodium acetate solution. There is thus obtained a blue equally-dyeing dye of pronounced fasteness to light. The dye consists of a sulfonic acid derived from the compound of the following constitution:

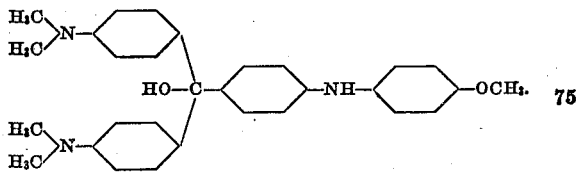

The position of the sulfonic groups cannot be indicated with certainty.

*Example 2.*—The dye of the constitution

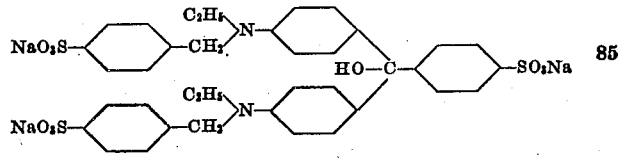

(see Schultz, Farbstofftabellen 1923, Vol. 1, No. 505) is heated to about 125° C., as described in German Specification No. 287,003, with 4 times its weight of 4-amino-1-ethoxybenzene in presence of a little hydrochloric acid until the green tint has passed to a pure blue. The new dye is separated from the excess of 4-amino-1-ethoxybenzene by dilute hydrochloric acid and is converted into the soluble sodium salt by resolution with aid of sodium acetate. The dye is easily soluble in water and dyes wool in a feebly acid bath clear blue tints of pronounced fastness to light. The dye probably corresponds to the formula:

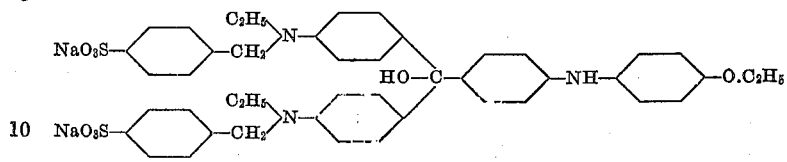

What we claim is:

1. The new triarylmethane dyes easily soluble in water and dyeing wool blue tints of a good fastness to light from a feebly acid bath, these dyes being alkali metal salts of sulfonic acids derived from a compound of the general formula:

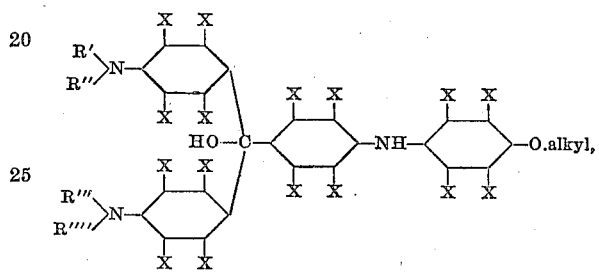

in which formula R', R'', R''', R'''' and X mean univalent radicles.

2. The new triarylmethane dyes easily soluble in water and dyeing wool from a feebly acid bath blue tints of a good fastness to light, these dyes being alkali metal salts of sulfonic acids derived from a compound of the general formula:

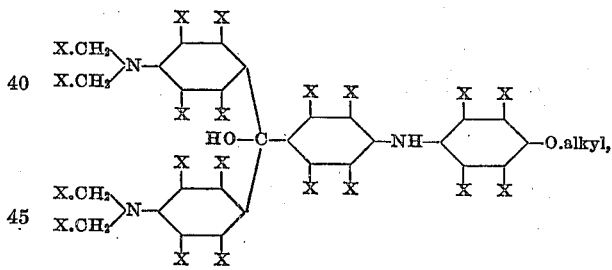

in which formula the X mean univalent radicles.

3. The new triarylmethane dyes easily soluble in water and dyeing wool from a feebly acid bath blue tints of a good fastness to light, these dyes being alkali metal salts of sulfonic acids derived from a compound of the general formula:

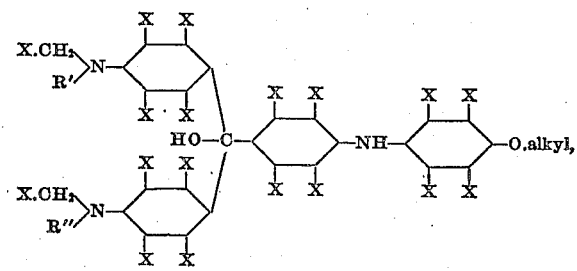

in which formula R' and R'' stand for aromatic radicles and X mean univalent radicles.

4. The new triarylmethane dyes mentioned in claim 3, in the formula R' and R'' meaning radicles of arylsulfonic acids and X meaning univalent radicles.

5. The new triarylmethane dyes easily soluble in water and dyeing wool from a feebly acid bath blue tints of a good fastness to light, these dyes being alkali metal salts of sulfonic acids derived from a compound of the general formula:

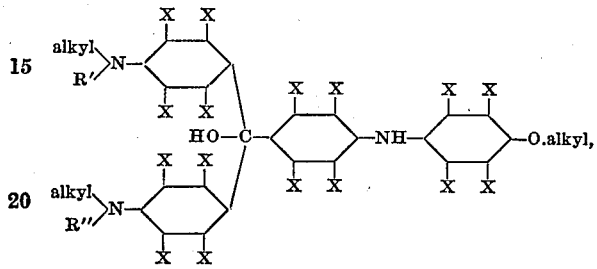

in which formula R' and R'' mean radicles of arylsulfonic acids and X stands for univalent radicles.

6. The new triarylmethane dyes easily soluble in water and dyeing wool from a feebly acid bath clear blue tints of good fastness to light, this dye being an alkali metal salt of the compound probably corresponding to the formula:

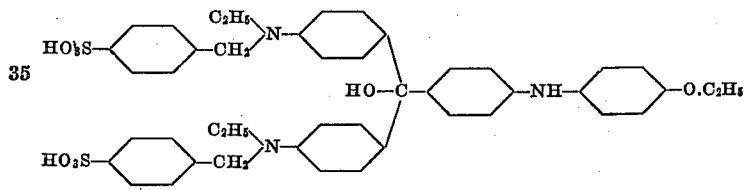

In testimony whereof, we affix our signatures.

HEINRICH POLIKIER.
OTTO BOEGER.